United States Patent [19]

Ishiwata et al.

[11] Patent Number: 5,412,494
[45] Date of Patent: May 2, 1995

[54] LIQUID CRYSTAL DEVICE WITH METAL OXIDE MASKING FILMS WITH BREAKS BETWEEN FILMS UNDER METAL LEAD ELECTRODES

[75] Inventors: Kazuya Ishiwata, Yokosuka; Takashi Enomoto, Zama; Toshifumi Yoshioka, Hiratsuka, all of Japan

[73] Assignee: Canon Kabushiki Kaisha, Tokyo, Japan

[21] Appl. No.: 750,246

[22] Filed: Aug. 27, 1991

[30] Foreign Application Priority Data

Aug. 30, 1990 [JP] Japan .................................. 2-226588

[51] Int. Cl.⁶ .................... G02F 1/1335; G02F 1/1343
[52] U.S. Cl. ...................................... 359/67; 359/68; 359/87
[58] Field of Search ................... 359/67, 68, 87

[56] References Cited

U.S. PATENT DOCUMENTS

| | | | |
|---|---|---|---|
| 4,367,924 | 1/1983 | Clark et al. | 350/334 |
| 4,561,726 | 12/1985 | Goodby et al. | 350/341 |
| 4,589,996 | 5/1986 | Inoue et al. | 252/299.65 |
| 4,592,858 | 6/1986 | Higuchi et al. | 252/299.66 |
| 4,596,667 | 6/1986 | Inukai et al. | 252/299.65 |
| 4,613,209 | 9/1986 | Goodby et al. | 350/350 S |
| 4,614,609 | 9/1986 | Inoue et al. | 252/299.66 |
| 4,622,165 | 11/1986 | Kano et al. | 252/299.65 |
| 4,853,296 | 8/1989 | Fukuyoshi | 359/68 |
| 5,000,545 | 3/1991 | Yoshioka et al. | 359/87 |
| 5,007,716 | 4/1991 | Hanyu et al. | 359/87 |
| 5,128,786 | 7/1992 | Yanagisawa | 359/67 |
| 5,150,233 | 9/1992 | Enomoto et al. | 359/54 |

FOREIGN PATENT DOCUMENTS

| | | |
|---|---|---|
| 0381526 | 8/1990 | European Pat. Off. . |
| 53-000653 | 1/1978 | Japan . |
| 57-016407 | 1/1982 | Japan . |
| 57-074707 | 5/1982 | Japan . |
| 58-046325 | 3/1983 | Japan . |
| 60-078401 | 5/1985 | Japan . |
| 60-129707 | 7/1985 | Japan . |
| 60-184202 | 9/1985 | Japan . |
| 60-184203 | 9/1985 | Japan . |
| 60-184204 | 9/1985 | Japan . |
| 60-184205 | 9/1985 | Japan . |
| 0210325 | 9/1986 | Japan .................... 359/67 |
| 0270915 | 11/1987 | Japan . |
| 63-038689 | 8/1988 | Japan . |
| 2-001311 | 1/1990 | Japan . |

OTHER PUBLICATIONS

Patent Abstracts of Japan, vol. 12, No. 154 (1988) P-700.
Alquié et al. Le Journal de Physique-Lettres, vol. 35, No. 1 pL-69-L-72 (1974) "Electron Spin Resonance of MnINPd and Pd-H".
Clark et al., Applied Physics Letters, vol. 36, No. 11, pp. 899-901 (1980), "Submicrosecond Bistable Electro-Optic Switching in Liquid Crystals".
Kotai, Solid State Physics, vol. 16, No. 3, pp. 141-151 (1981).
Schadt et al., Applied Physics Letters, vol. 18, No. 4, pp. 127-128 (1971), "Voltage-Dependent Optical Activity of a Twisted Nematic Liquid Crystal".

*Primary Examiner*—Anita Pellman Gross
*Attorney, Agent, or Firm*—Fitzpatrick, Cella, Harper & Scinto

[57] ABSTRACT

A liquid crystal device is formed by disposing a liquid crystal between a plurality of elongated first display electrodes on a first substrate and a plurality of elongated second display electrodes on a second substrate so as to form a pixel at each intersection of the first and second display electrodes. The spacings between the pixels are masked by a metal oxide light-shielding mask disposed in lamination with the first display electrodes with an intermediate insulating film. The metal oxide light-shielding mask is separated into a plurality of discrete metal oxide masking films each allotted to a pixel at parts in alignment with at least one of first and second metal lead electrodes disposed along and in electrical contact with the first and second display electrodes. The structure is effective for preventing leakage light through a spacing between pixels without causing a short circuit between pixels, liquid crystal alignment disorder or peeling-off of the insulating film.

4 Claims, 3 Drawing Sheets

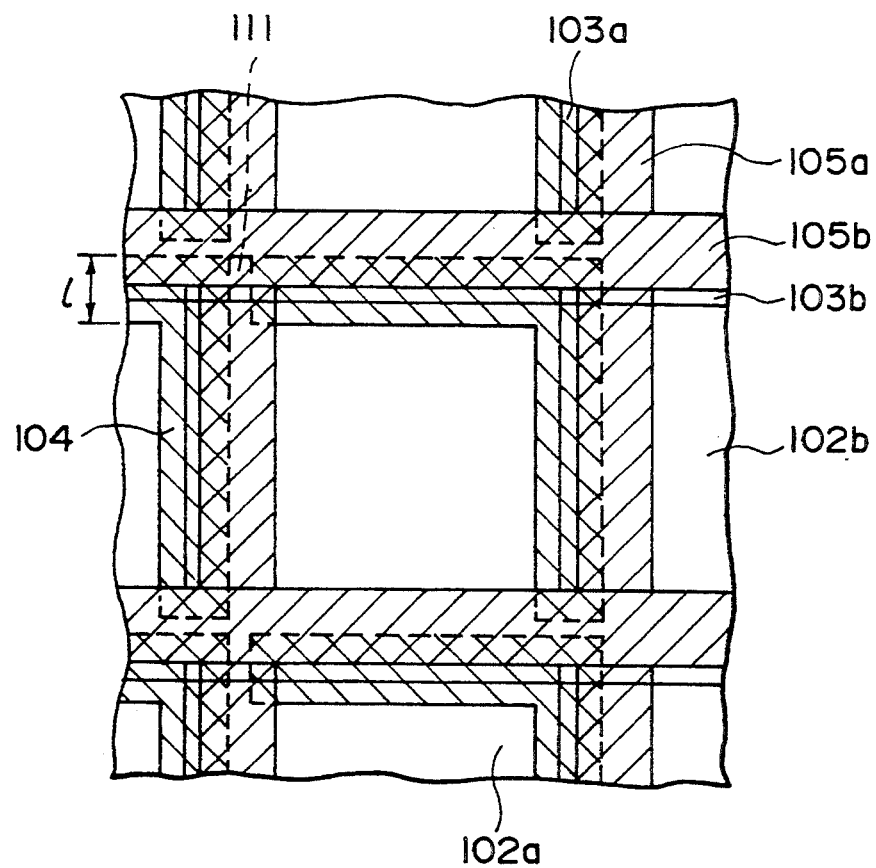
F I G. 1

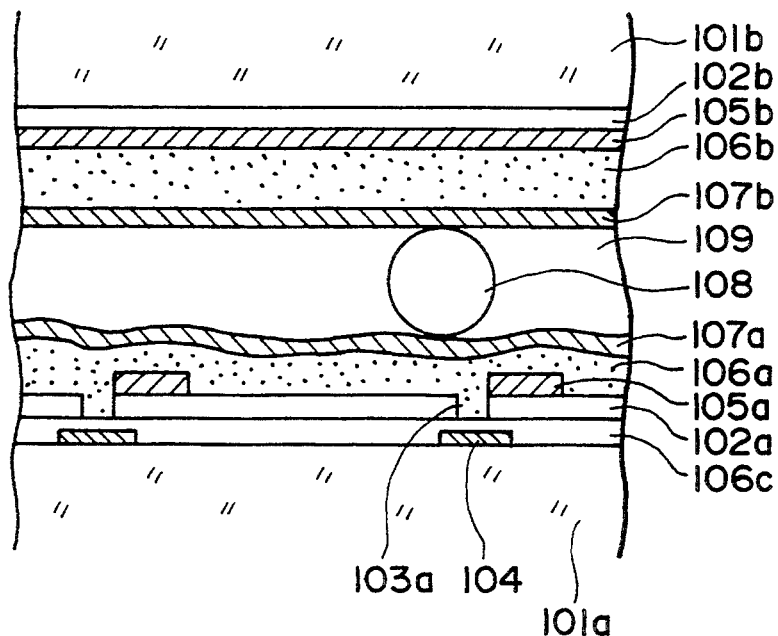
F I G. 2
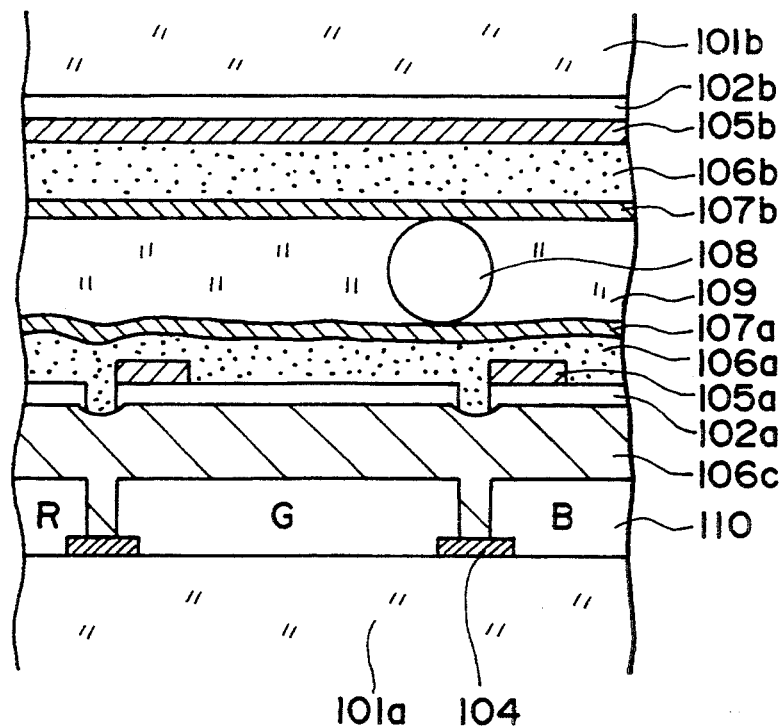
F I G. 3

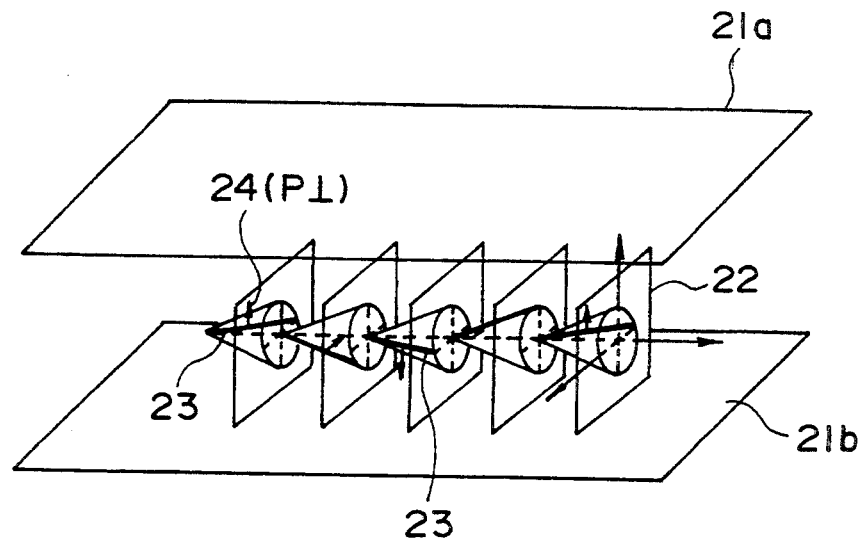
F I G. 4A
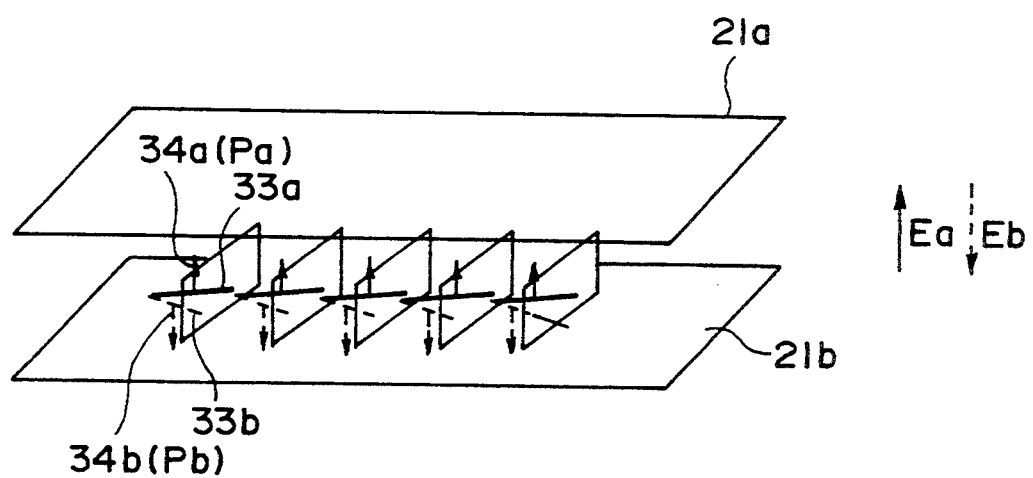
F I G. 4B

LIQUID CRYSTAL DEVICE WITH METAL OXIDE MASKING FILMS WITH BREAKS BETWEEN FILMS UNDER METAL LEAD ELECTRODES

FIELD OF THE INVENTION AND RELATED ART

The present invention relates to a liquid crystal device, particularly a matrix-type liquid crystal device provided with a metal (light-)shielding mask for preventing leakage of light through between pixels to provide an improved display characteristic.

Hitherto, as conventional liquid crystal devices, those using a twisted nematic liquid crystal as disclosed by M. Schadt and W. Helfrich, "Voltage-Dependent Optical Activity of a Twisted Nematic Liquid Crystal", Applied Physics Letters, Vol. 18, No. 4 (Feb. 15, 1971), p.p. 127–128, have been known.

Such a twisted nematic-type liquid crystal involves a problem of causing crosstalk when it is incorporated in a device using a matrix electrode structure forming pixels in a high density and subjected to multiplexing drive, so that the number of pixels has been restricted in this respect.

In contrast thereto, there has been also known a type of display device wherein each pixel is provided with a thin film transistor for switching. This type of device has an advantage that it can provide a high contrast ratio of 200–300 but is accompanied with problems that a step of forming thin film transistors on a substrate is very complicated and it is difficult to produce a large-area display device.

As a solution to these problems, Clark et al have proposed a ferroelectric liquid crystal device (U.S. Pat. No. 4,367,924).

FIG. 4A is a schematic illustration of a ferroelectric liquid crystal cell (device) for explaining operation thereof. Reference numerals 21a and 21b denote substrates (glass plates) on which a transparent electrode of, e.g., $In_2O_3$, $SnO_2$, ITO (indium-tin-oxide), etc., is disposed, respectively. A liquid crystal in an SmC*-phase (chiral smectic C phase) or SmH*-phase (chiral smectic H phase) in which liquid crystal molecular layers 22 are aligned perpendicular to surfaces of the glass plates is hermetically disposed therebetween. Full lines 23 show liquid crystal molecules. Each liquid crystal molecule 23 has a dipole moment (P⊥) 24 in a direction perpendicular to the axis thereof. The liquid crystal molecules 23 continuously form a helical structure in the direction of extension of the substrates. When a voltage higher than a certain threshold level is applied between electrodes formed on the substrates 21a and 21b, a helical structure of the liquid crystal molecule 23 is unwound or released to change the alignment direction of respective liquid crystal molecules 23 so that the dipole moments (P⊥) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Further, when the liquid crystal cell is made sufficiently thin (e.g., less than about 10 microns), the helical structure of the liquid crystal molecules is unwound to provide a non-helical structure even in the absence of an electric field, whereby the dipole moment assumes either of the two states, i.e., Pa in an upper direction 34a or Pb in a lower direction 34b as shown in FIG. 4B, thus providing a bistable condition. When an electric field Ea or Eb higher than a certain threshold level and different from each other in polarity as shown in FIG. 4B is applied to a cell having the above-mentioned characteristics, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b.

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 4B. When the electric field Ea is applied to the liquid crystal molecules, they are oriented in the first stable state 33a. This state is stably retained even if the electric field is removed. On the other hand, when the electric field Eb of which direction is opposite to that of the electric field Ea is applied thereto, the liquid crystal molecules are oriented to the second stable state 33b, whereby the directions of molecules are changed. This state is similarly stably retained even if the electric field is removed. Further, as long as the magnitude of the electric field Ea or Eb being applied is not above a certain threshold value, the liquid crystal molecules are placed in the respective orientation states. In order to realize such high response speed and bistability, it is preferred that the thickness of the cell is as thin as possible.

In order for such a ferroelectric liquid crystal device to exhibit the desired drive performances, it is required that the ferroelectric liquid crystal disposed between a pair of parallel substrates has a molecular arrangement such that the molecules can effectively be switched between the two stable states independently of the application of an electric field. For instance, with respect to a ferroelectric liquid crystal in a chiral smectic phase, it is required that there is formed a region (monodomain) wherein liquid crystal molecular layers in the chiral smectic phase are perpendicular to the substrate faces and therefore the liquid crystal molecular axes are parallel to the substrate faces. However, in a ferroelectric liquid crystal device available heretofore, a liquid crystal alignment state having such a monodomain structure has not been satisfactorily realized, so that sufficient performances have not been accomplished up to now.

Further, it has been impossible to obtain a sufficiently large angle between the orientations of the liquid crystal molecules 23 at the above-mentioned two stable states (tilt angle), so that a ferroelectric liquid crystal device has been used at a contrast ratio of about 80–120.

Hitherto, almost no simple matrix-type liquid crystal display apparatus using such a liquid crystal device has adapted a light-shielding mask between pixels regardless of whether it is of a reflection-type or a transmission-type. Recently, however, it has been proposed to dispose a light-shielding mask between pixels in order to improve the high resolution and display quality. For example, Japanese Patent Publication (JP-B) 38689/1988 has proposed a structure wherein metal electrodes as lead electrodes are disposed in the form of ladders on transparent electrodes for display on one substrate so as to mask gaps between pixels on the counter substrate. Further, as for devices provided with a color filter, JP-B 653/1978 has proposed to dispose a color filter between light-shielding layers, and JP-B 1311/1990 has proposed to dispose an opaque film at a boundary between color filters and dispose a transparent film thereon.

Such a metal light-shielding mask is coated with an insulating layer which may be composed of an inorganic material of, e.g., an oxide such as $SiO_2$, $Ta_2O_5$ and $Al_2O_3$, or an organic material such as polyimide and polyamide, or an organic metal oxide.

Further, the color filter, etc., formed on the metal light-shielding mask may also be regarded as a kind of insulating film.

As a color filter, there is known a dyed color filter which is obtained by forming a dyeable layer of a hydrophilic polymer, such as gelatin, casein, glue or polyvinyl alcohol and then dyeing the dyeable layer to form a color layer.

Such a dyed color filter has an advantage that many dyes are available so that it is easy to obtain a desired spectral characteristic but is accompanied with a difficulty of a poor yield because the production process involves a wet step requiring a difficult control of dipping the dyeable layer within a dyeing bath containing a dye dissolved therein and also a complicated step of providing an intermediate layer for dye-prevention between respective colors. Further, the heat resistance of the available dyes is about 150° C. or below and is thus relatively low, so that it is not applicable when the filter is subjected to a thermal treatment, and the resultant dyed film per is accompanied with a poor reliability in respects of heat resistance and light fastness.

On the other hand, there has been also known a type of color filter which comprises a colored resin obtained by dispersing a certain colorant or pigment in a transparent resin.

For example, a color filter obtained by mixing a colorant within a polyamine-type resin (as disclosed in, e.g., Japanese Laid-Open Patent Applications (JP-A) 46325/1983, 78401/1985, 184202/1985, 184203/1985, 184204/1985 and 184205/1985) is excellent in properties, such as heat resistance and light-fastness. As the resin is not photosensitive, the patterning of a color filter requires a printing process which is not advantageous for fine pattern formation or a process involving complicated steps of forming a mask of a resist on a colored resin film and then etching the colored resin film.

Further, a color filter formed as a colored resin film obtained by mixing a colorant within a photosensitive resin (as disclosed in JP-A 16407/1982, 4707/1982, 129707/1982, etc.), allows a simple process including only ordinary photolithographic steps of fine patterning.

In the case of forming a color filter by using such a colored resin comprising a mixture of a photosensitive resin and a colorant, however, the colorant per se generally has a light absorption in the exposure wavelength region, so that a larger exposure energy is required for photocuring of the photosensitive resin than in ordinary cases.

Photointensity at the time of exposure through a photosensitive resin layer generally decreases exponentially with the depth from the photoirradiation surface. Accordingly, the attenuation of incident light intensity becomes remarkably large along the depth from the photoirradiation surface when a light-absorptive colorant is contained in the photosensitive resin, so that photocuring of the photosensitive colored resin is liable to be insufficient in the neighborhood of the bottom of the resin layer, i.e., the boundary with the substrate, thus causing peeling of the resin layer at the time of development in some cases.

Further, if the exposure energy is remarkably increased so as to compensate for the attenuation of incident light intensity, the deterioration of the colorant per se can be caused.

Further, the inclusion of a colorant can cause a roughening of the colored resin film surface, leading to a deterioration of the color filter performance due to scattering at the color filter surface and also a disorder of alignment of liquid crystal molecules when the color filter layer is disposed on the inner side of the liquid crystal device.

As described above, the production of a color filter by using a mixture colored resin of a photosensitive resin and a colorant has left problems in respects of stability and durability of the resultant color filter film and performance of the color filter.

In order to solve the above-mentioned problems, our research group has proposed a color filter which may be patterned effectively at a lower exposure energy with less deterioration of a colorant at the time of exposure and with less fluctuation in photocuring in the thickness-wise direction to provide a colored resin film with a smoother surface state. More specifically, the color filter is one having a plurality of patterned color resin layers formed by using a colored resin obtained by dispersing at least a colorant in a photosensitive resin and repeating photolithographic steps and characterized in that the colorant is present in the colored resin layer in a gradually increasing amount from the surface toward the bottom of the colored resin layer.

In the above-described various types of liquid crystal panels, it is a general practice to dispose a light-shielding layer between respective pixels so as to provide an improved contrast. More specifically, such a light-shielding layer may be formed by forming a layer of a photosensitive colored resin by spin coating and, after coverage with an oxygen-shielding film, exposing and developing the photosensitive colored resin layer.

On the other hand, a metal light-shielding layer has also been formed so as to provide an increased contrast.

Referring back to the above-described prior art, if metal lead electrodes are disposed in the form of ladders on display electrodes so as to form a light-shielding mask between pixels, a ferroelectric liquid crystal, for example, is liable to cause an alignment disorder at a part surrounded by metal electrodes.

In order to alleviate such a defect, it has been known to dispose a light-shielding mask directly on a substrate, such as a glass plate, and then dispose thereon an insulating film as described above. Such a light-shielding mask is generally disposed at all the parts except for the effective display region. When a light-shielding mask of a metal giving a high shielding effect at a small thickness is disposed at the parts except for the effective display region, it is liable to cause a short circuit between elements unless an intermediate insulating film between the light-shielding mask and metal electrodes on a substrate is perfect.

For example, in case where such a light-shielding mask is disposed over a certain area while leaving only a display region in the form of windows and covered with an insulating layer, and then display electrodes and lead electrodes are disposed thereon, a defect of conduction between the light-shielding mask at the lowermost layer and, e.g., a lead electrode is liable to occur due to the presence of an electroconductive contaminant in the insulating layer. If such a defect occurs at a single point, or at two points on a particular data electrode constituting an electrode matrix, such a defect would not cause a serious problem. Such a defect can however cause a conduction between two or more independent pixels. In this case, image data inputted to a particular pixel can also be inputted to another pixel through the metal light-shielding mask to cause an erroneous operation of such another pixel.

Further, as another defect, it has been found that a metal light-shielding mask of Mo, etc., conventionally used, shows a poor adherence to a color filter, so that it is liable to be peeled during the production process.

SUMMARY OF THE INVENTION

In view of the above-mentioned difficulties of the prior art, an object of the present invention is to provide a liquid crystal device provided with a metal light-shielding mask disposed in separation for each pixel so as to prevent a short circuit with another pixel even in case of abnormality in an insulating film.

Another object of the present invention is to provide a liquid crystal device provided with metal light-shielding masks separated from each other at a part in alignment with a metal lead electrode disposed on either one substrate so as to prevent occurrence of non-metal masking parts and a decrease in contrast or deterioration in display quality due to leakage light.

A further object of the present invention is to provide a liquid crystal device with a light-shielding mask of a metal showing a good adhesiveness even to a color filter layer.

According to the present invention, there is provided a liquid crystal device, comprising:

a first substrate having thereon a metal light-shielding mask, a plurality of elongated first display electrodes each having a first metal lead electrode disposed along and in electrical contact therewith, and an insulating layer disposed between the metal light-shielding mask and the first display electrodes, a second substrate having thereon a plurality of elongated second display electrodes each having a second metal lead electrode disposed along and in electrical contact therewith, the elongated second display electrodes being disposed to intersect with the elongated first display electrodes, and a liquid crystal disposed between the first and second substrates so as to form a pixel at each intersection of the first display electrodes and the second display electrodes, wherein the metal light shielding mask is separated into a plurality of discrete metal masking films each allotted to a pixel so as to mask substantially all the spacings between the pixels, the place of the separation between the masking films being disposed in alignment with at least one of the first and second metal lead electrodes.

The metal light-shielding mask comprises a light-shielding material and is disposed on a substrate so as to mask spacings between display pixels. The metal light-shielding mask is covered with an insulating layer, on which the display electrodes and metal lead electrodes associated therewith are formed. The metal light-shielding mask is further separated into discrete metal masking films so that, even if some electroconductive contaminants are present in the insulating layer to provide defects of conduction between the metal lead electrodes and the metal masking-films, the defects are confined to respective pixels and therefore prevented from causing a short circuit with other pixels.

If the separation is formed at an arbitrary part, some parts of light-shielding failure can occur to cause a decrease in contrast and a deterioration in display quality due to leakage light. In the present invention, however, the place of separation between the metal masking-films is disposed at a part shaded by at least one of the metal lead electrodes (data (segment) electrodes and scanning (common) electrodes), so that a place causing a light-shielding failure is prevented from occurring.

If the masking films are constituted by chromium or/and chromium oxide, it is possible to prevent peeling-off of a resinous color filter formed on the metal masking films.

These and other objects, features and advantages of the present invention will become more apparent upon a consideration of the following description of the preferred embodiments of the present invention taken in conjunction with the accompanying drawings, wherein like reference numerals denote like parts.

BRIEF DESCRIPTION OF THE DRAWINGS

FIG. 1 is a schematic plan view showing an embodiment of the liquid crystal device according to the present invention.

FIG. 2 is a schematic sectional view showing a sectional view of an embodiment of the liquid crystal device according to the present invention.

FIG. 3 is a schematic sectional view showing a sectional view of another embodiment of the liquid crystal device according to the present invention.

FIGS. 4A and 4B are schematic perspective views for illustration of an operation principle of a ferroelectric liquid crystal device.

DESCRIPTION OF THE PREFERRED EMBODIMENTS

FIG. 1 is a schematic partial plan view of an embodiment of the liquid crystal device according to the present invention. Referring to FIG. 1, the liquid crystal device includes lower elongated display electrodes 102a disposed with a spacing 103a therebetween on a lower substrate (101a, not shown), upper elongated display electrodes 102b disposed with a spacing 103b therebetween on an upper substrate (101b, not shown), metal masking films 104 as a whole constituting a metal light-shielding mask and disposed with a spacing at separating points 111 on the lower substrate, lower metal lead electrodes 105a and upper metal lead electrodes 105b disposed along and in electrical contact with the display electrodes 102a and 102b, respectively, and on the lower and upper substrates, respectively. Other parts are omitted from showing and will be explained with reference to a sectional view (FIGS. 2 or 3 explained below). The spacings 103a and 103b between the respective display electrodes 105a and 105b also constitute spacings between pixels constituted at intersections of the elongated display electrodes 105a and 105b.

FIG. 2 is a corresponding sectional view of an embodiment of the liquid crystal device which is not provided with a color filter. Referring to FIG. 2, the liquid crystal device further includes lower and upper substrates 101a and 101b, insulating layers 106a and 106b respectively on the electrodes, an insulating layer 106c disposed between the metal masking films 104a and the display electrodes 102a, alignment films 107a and 107b, and spacers 108 for defining a cell gap to be filled with a liquid crystal 109 between the alignment films 107a and 107b.

Referring to FIGS. 1 and 2 more specifically, the liquid crystal device comprises a pair of substrates 101a and 101b each composed of, e.g., a glass plate or a plastic plate, which are spaced from each other with spacers 108 of, e.g., silica beads or alumina beads, so as to leave a prescribed gap of, e.g., 0.1 micron to 3 microns, to form a cell structure into which a liquid crystal 109 is hermetically injected. The lower substrate 101a is provided with a metal light-shielding mask comprising a plurality of discrete metal masking films 104, an insulating layer 106c, display electrodes 102a, metal lead electrodes 105a, an insulating layer 106a and an alignment film 107a, which are disposed in the order enumerated on the lower substrate 101a.

On the other hand, the upper substrate 101b is provided with display electrodes 102b, metal lead electrodes 105b, an insulating layer 106b and an alignment film 107b, which are disposed in the order enumerated on the upper substrate 101b.

In the embodiment shown in FIG. 2 which is provided with no color filter on the metal masking films 104. The masking films 104 may suitably be composed of a metal, such as chromium, chromium oxide, aluminum or tantalum. The metal masking films 104 may be formed by an arbitrary method, such as sputtering or electron beam evaporation in a thickness suitable for providing a desired light-shielding rate, e.g., 500–1000 Å of chromium or 500–1200 Å of molybdenum for providing a light-shielding rate of about 80% or higher, and 800–1000 Å of chromium or 1000–1200 Å of molybdenum for providing a light-shielding rate of about 99.5% or higher.

The insulating layers 106a, 106b and 106c may be formed of a material, such as $TiO_2$, $Ta_2O_5$, $SiO_2$ or $Al_2O_3$, in a thickness of, e.g., 200–1200 Å.

The display electrodes 102a and 102b may be formed of a material, such as $In_2O_3$, or ITO (indium tin oxide).

The metal lead electrodes 105a and 105b may be formed of a material, such as Mo, Al, Cr or an alloy of these metals, in a thickness of, e.g., 500–5000 Å.

The alignment films 107a and 107b may be formed of, e.g., an inorganic insulating material, such as silicon monoxide, silicon dioxide, aluminum oxide, zirconia, magnesium fluoride, cerium oxide, cerium fluoride, silicon nitride, silicon carbide, and boron nitride; or an organic insulating material, such as polyvinyl alcohol, polyimide, polyamideimide, polyesterimide, polyparaxylylene, polyester, polycarbonate, polyvinyl acetal, polyvinyl chloride, polyamide, polystyrene, cellulosic resin, melamine resin, urea resin and acrylic resin, in a thickness of, e.g., 50–1000 Å.

The alignment films 107a and 107b may be provided with uniaxial orientation axes, e.g., by rubbing. The directions of the uniaxial orientation axes provided to the pair of the films 107a and 107b may vary depending on the display modes of the liquid crystal used but may suitably be parallel and in an identical direction for a ferroelectric liquid crystal, for example.

The liquid crystal 109 used in the present invention is not basically restricted and can be selectively selected from various liquid crystals inclusive of nematic liquid crystals and smectic liquid crystals. However, the present invention can be most effectively applied to a smectic liquid crystal, particularly a ferroelectric smectic liquid crystal, having a delicate alignment characteristic.

More specifically, it is possible to use a liquid crystal in chiral smectic C phase (SmC*), chiral smectic G phase (SmG*), chiral smectic F phase (SmF*), chiral smectic I phase (SmI*), or chiral smectic H phase (SmH*).

Details of ferroelectric liquid crystals are described in, e.g., LE JOURNAL DE PHYSIQUE LETTERS, 36 (L-69) 1975, "Ferroelectric Liquid Crystals"; Applied Physics Letters, 36 (11), 1980, "Submicro-Second Bistable Electrooptic Switching in Liquid Crystals"; Kotai Butsuri (Solid State Physics), 16 (141), 1981, "Ekisho (Liquid Crystals)"; U.S. Pat. Nos. 4,561,726; 4,589,996; 4,592,858; 4,596,667; 4,613,209; 4,614,609 and 4,622,165. Ferroelectric liquid crystals disclosed in these references may be used in the present invention.

Specific examples of ferroelectric liquid crystals may include: decyloxybenzylidene-p'-amino-2-methylbutylcinnamate (DOBAMBC), hexyloxybenzylidene-p'-amino-2-chloropropylcinnamate (HOBACPC), and 4-O-(2-methyl)butylresorcylidene-4'-octylaniline (MBR8).

As is shown in FIG. 1, in the present invention, the metal masking films 104 constituting a metal light-shielding mask are separated from each other at a part 111 in alignment with at least one of the metal lead electrodes 105a and 105b, so that each discrete masking film 104 is allotted to a pixel. As a result, any of the spacings 103a and 103b between pixels may be masked without causing any light leakage.

FIG. 3 is a schematic sectional view of another embodiment of the liquid crystal device according to the present invention. The liquid crystal device shown in FIG. 3 is different from the one shown in FIG. 2 only in that a color filter layer 110 including color segments R, G and B is inserted between the metal masking films 104 and the insulating layer 106c. The other structures are identical to those in FIG. 2. In FIGS. 2 and 3, like parts are denoted by like reference numerals.

In the embodiment, the color filter 110 may preferably comprise a colored resin which contains a colorant dispersed in a photosensitive resin.

The photosensitive resin constituting the color filter may generally be a known one but particularly preferably be an aromatic polyamide resin or an aromatic polyimide resin having in its molecule a photosensitive group as shown below:

(1) benzoate esters represented by the formula:

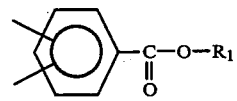

wherein $R_1$ denotes $CHX=CY-COOZ$, X denotes —H o—r $C_6H_5$, Y denotes —H or —$CH_3$, and Z denotes a single bond, an ethylene group or a glycidylene group;

(2) benzylacrylates represented by the formula:

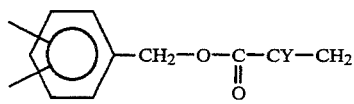

wherein Y denotes —H or —CH₃;

(3) diphenyl ethers represented by the formula:

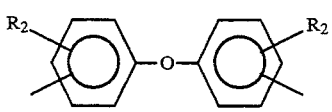

wherein R₂ denotes a group containing at least one of CHX=CHY—CONH, CH₂=CY—COO—(CH₂-)₂—OCO or CH₂=CY—COOCH₂—, X and Y are the same as above;

(4) chalcones and like compounds represented by the formulas:

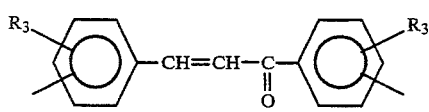

wherein R₃ denotes H—, an alkyl group or an alkoxy group,

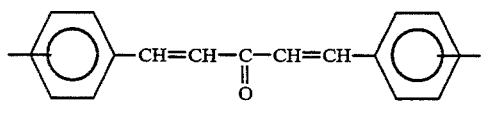

and

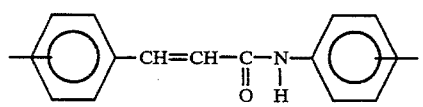

Specific examples of the aromatic polyamides and polyimides may include those available under the trade names of Lithocoat PA-1000 (available from Ube Kosan K.K.) and Lithocoat PI-400 (available from Ube Kosan K.K.).

On the other hand, the colorant dispersed in a colored resin constituting the color filter 10 may be selected from organic pigments and inorganic pigments according to desired spectral characteristic but may preferably be selected from organic pigments, examples of which may include: azo pigments, such as insoluble azo pigments and condensed azo pigments, phthalocyanine pigments, indigos, anthraquinones, perylenes, perynones, dioxazines, quinacrydones, isoindolinones, phthalones, methines, azomethines, other condensed polycyclic pigments including metal complexes, and mixtures of these.

The color filter layer 10 may be formed by applying such a colored resin by, e.g., spin coating or roller coating, and patterning the colored resin film into desired patterns of color segments R, G and B through photolithographic steps. The thicknesses of the respective color segments R, G and B constituting the color filter layer 10 may be determined depending on their spectral characteristics but ordinarily in the range of about 0.5–5 microns, preferably 1–2 microns.

In an embodiment including a color filter layer 110 on metal masking films 104, it is particularly preferred to constitute the masking films 104 with chromium or/and chromium oxides so as to prevent the peeling between the masking films and the color filter layer 110.

Hereinbelow, the present invention will be explained more specifically based on Examples.

EXAMPLE 1

A liquid crystal device as explained with reference to FIGS. 1 and 2 in combination was prepared.

First, a lower glass substrate 101a measuring 300 mm×300 mm was coated by sputtering with a 700 Å-thick Mo (molybdenum) layer, which was then patterned through photolithographic steps into Mo masking films 104. Each masking film 104 was patterned into the shape of "L" so as to extend along two sides of an associated pixel and cover spacings 103b and 103a from adjacent two pixels as shown in FIG. 1 to have a width l of about 30 microns and be separated from another adjacent masking film 104 with a spacing 111 of about 10 microns which was determined in consideration of a device size and accuracy of patterning and alignment between the substrates 101a and 101b. The place of each spacing 111 was determined so as to be in alignment with the center of a metal lead electrode 105b in this embodiment. The masking film width l was determined so as to provide a marginal width of about 10 microns on both sides of the spacings 103a and 103b each in a idth of 10 microns to ensure the prevention of light leakage through the spacings.

The Mo masking films 104 were then coated with an about 1000 Å-thick SiO₂ film 106c by sputtering. The SiO₂ film is generally preferred to have a thickness of at least 500 Å so as to provide a sufficient adhesiveness with the Mo films 104a.

Then, a 1500 Å-thick ITO transparent electrode film was formed by sputtering on the SiO₂ film 106c and patterned by etching to form a spacing 103a to leave 190 micron-wide stripe display electrodes 102a expected to be used as data electrodes. Then, a 2000 Å-thick Mo film was deposited to cover the display electrodes 102a and patterned by etching to form a 30 micron-wide Mo lead electrode 105a along one side of each stripe display electrode 102a. Then, the electrodes were covered by sputtering with a 500 Å-thick SiO₂ film 106a as an insulating film for preventing a short-circuit between opposite electrodes and then coated with a 100 Å-thick polyimide alignment film 107a.

An opposite substrate 101b was provided in a similar manner with stripe display electrodes 102b expected to be used as scanning electrodes, Mo lead electrodes 105b, an SiO₂ insulating film 106b and a polyimide alignment film 107b.

The two substrates 101a and 101b thus treated were, after rubbing of the alignment films 107a and 107b, were applied to each other with SiO₂ beads having an average particle size of 1.5 microns to form a blank cell, which was then filled with a pyrimidine-type ferroelectric liquid crystal (showing a phase transition series of isotropic → cholesteric → smectic A → chiral smectic C) to form a liquid crystal device.

The thus obtained liquid crystal device showed a high contrast and a good black display state free from leakage light through between pixels and short circuit between pixels.

EXAMPLE 2

A liquid crystal device with a color filter as explained with reference to FIGS. 1 and 3 was prepared.

A 1.1 mm-thick glass plate 101a was first coated with a 1000 Å-thick Cr film, which was patterned in a similar manner as in Example 1 to form Cr masking films 104. Thereon, a color filter layer 110 was formed by using three colored resins obtained by dispersing pigments of R, G and B, respectively, in a photosensitive polyamide resin and repeating photolithographic steps for the respective colors. Then, the color filter layer 110 was covered with a 1.5 micron-thick polyamide film 106c as a protective insulating layer. Then, 1500 Å-thick ITO display electrodes 102a and 1500 Å-thick Mo lead electrodes 105a were formed similarly as in Example 1 and then covered with a 1500 Å-thick Ti/Si (1/1) insulating layer 106a by wet coating and with a 200 Å-thick alignment film for ferroelectric liquid crystal 107a.

An opposite substrate 101b was provided in a similar manner with stripe display electrodes 102b, Mo lead electrodes 105b, a Ti/Si insulating film 106b and an alignment film 107b.

The two substrates 101a and 101b thus treated were, after rubbing of the alignment films 107a and 107b, were applied to each other with SiO2 beads having an average particle size of 1.3 micron to form a blank cell, which was then filled with the ferroelectric liquid crystal used in Example 1 to form a liquid crystal device.

The thus obtained liquid crystal device showed an improved adhesiveness with the polyamide resin color filter because the masking films were composed by Cr, so that no defects were caused by peeling during the production process. The liquid crystal device also showed an improved contrast due to the light-shielding effect, improved prevention of short circuit between display pixels and an improved responsive characteristic.

COMPARATIVE EXAMPLE

A liquid crystal device was prepared in the same manner as in Example 1 except that an Mo light-shielding mask was prepared in the form of a connected network structure instead of the separated masking films. The liquid crystal device thus prepared caused a short circuit between pixels, thus failing to effect a normal image display in some cases.

For the purpose of comparison, 8 panels were prepared according to the above Comparative Example and compared with 240 panels prepared according to Example 1 with respect to occurrence of short circuit between pixels. The results are summarized in the following table 1.

TABLE 1

| Comp. | Panel No. | 1 | 2 | 3 | 4 | 5 | 6 | 7 | 8 |
|---|---|---|---|---|---|---|---|---|---|
| Ex. | No. of short circuit | 0 | 0 | 4 | 3 | 0 | 3 | 2 | 3 |
| Ex. 1 | Panel No. | 1–24 ||||||||
|  | No. of short circuit | 0 in all cases ||||||||

As described above, according the liquid crystal device of the present invention wherein a metal light-shielding mask is separated into a plurality of discrete films each allotted to a pixel, short circuit between pixels is substantially prevented even if electroconductive contaminants are present in an insulating layer disposed between the metal light-shielding mask and the display electrodes (and metal lead electrodes). Further, by disposing the place of the separation between the masking films in alignment with the metal lead electrode, any place of light-shielding failure is not allowed to be present, thus preventing a decrease in contrast or a lowering in image quality due to leakage light. Further, by constituting such a masking film with a Cr-based material, a good adhesion is ensured even in contact with a resinous color filter.

What is claimed is:

1. A liquid crystal device, comprising:
    a first substrate having thereon a metal oxide light-shielding mask, a plurality of elongated first display electrodes each having a first metal lead electrode disposed along and in electrical contact therewith, and an insulating layer disposed between the metal oxide light-shielding mask and the first display electrodes,
    a second substrate having thereon a plurality of elongated second display electrodes each having a second metal lead electrode disposed along and in electrical contact therewith, the elongated second display electrodes being disposed to intersect with the elongated first display electrodes, and
    a liquid crystal disposed between the first and second substrates so as to form a pixel at each intersection of the first display electrodes and the second display electrodes,
    wherein the metal oxide light shielding mask is separated into a plurality of discrete metal oxide masking films each allotted to a pixel so as to mask substantially all the spacings between the pixels, the place of the separation between the masking films being disposed in alignment with at least one of the first and second metal lead electrodes.

2. A liquid crystal device according to claim 1, wherein said insulating layer comprises a color filter layer formed by dispersing a colorant in a photosensitive resin.

3. A liquid crystal device according to claim 1, wherein said metal oxide masking films comprise chromium oxide.

4. A liquid crystal device according to claim 1, wherein said liquid crystal is a ferroelectric liquid crystal.

* * * * *

UNITED STATES PATENT AND TRADEMARK OFFICE
CERTIFICATE OF CORRECTION

PATENT NO. : 5,412,494
DATED : May 2, 1995
INVENTOR(S) : KAZUYA ISHIWATA ET AL.

It is certified that error appears in the above-identified patent and that said Letters Patent is hereby corrected as shown below:

COLUMN 3

Line 38, "per" should read --per se--.
Line 58, "4707/1982," should read --74707/1982,--.

COLUMN 8

Line 68, "o-r" should read --or--.

COLUMN 10

Line 33, "idth" should read --width--.

UNITED STATES PATENT AND TRADEMARK OFFICE
CERTIFICATE OF CORRECTION

PATENT NO. : 5,412,494
DATED : May 2, 1995
INVENTOR(S) : KAZUYA ISHIWATA ET AL.

It is certified that error appears in the above-identified patent and that said Letters Patent is hereby corrected as shown below:

COLUMN 12

Line 8, "according" should read --according to--.

Signed and Sealed this

Fifth Day of September, 1995

Attest:

BRUCE LEHMAN

Attesting Officer

Commissioner of Patents and Trademarks